April 28, 1970          H. L. WRIGHT          3,508,362
MECHANISM FOR OPENING AND CLOSING WINDOWS
Filed Jan. 24, 1969          2 Sheets-Sheet 1
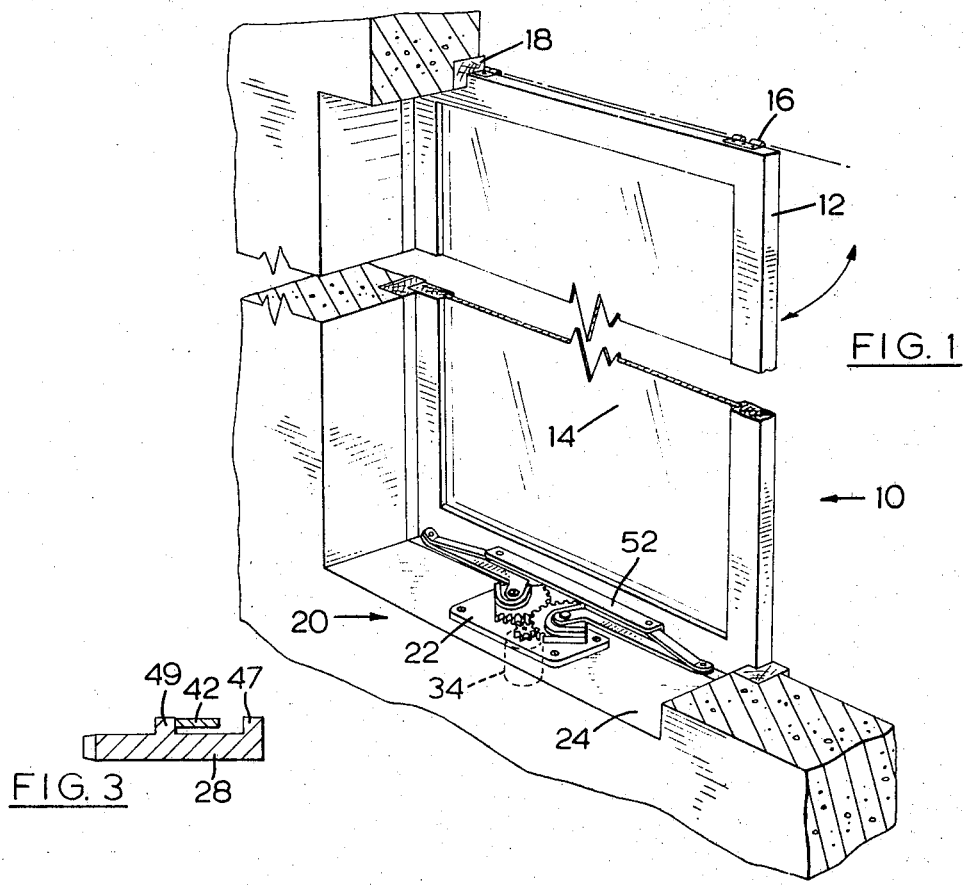
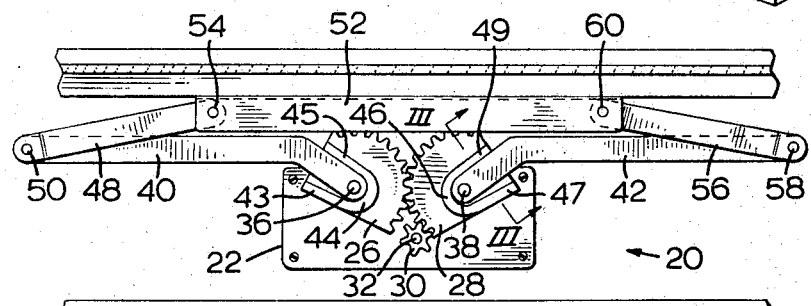
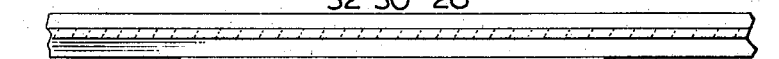
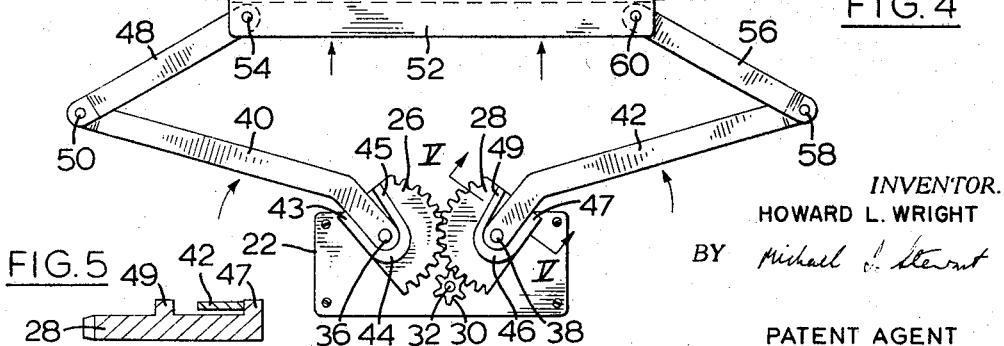
INVENTOR.
HOWARD L. WRIGHT
BY *Michael L. Stewart*
PATENT AGENT April 28, 1970 H. L. WRIGHT 3,508,362
MECHANISM FOR OPENING AND CLOSING WINDOWS
Filed Jan. 24, 1969 2 Sheets-Sheet 2

*INVENTOR.*
HOWARD L. WRIGHT
BY *Michael L. Stewart*

PATENT AGENT

United States Patent Office 3,508,362
Patented Apr. 28, 1970

3,508,362
MECHANISM FOR OPENING AND CLOSING WINDOWS
Howard L. Wright, Toronto, Ontario, Canada, assignor to Electro-Glide (68) Limited, Thornhill, Ontario, Canada
Filed Jan. 24, 1969, Ser. No. 793,658
Int. Cl. E05f 5/12, 11/22
U.S. Cl. 49—340                                        11 Claims

ABSTRACT OF THE DISCLOSURE

A motor-driven window opening and closing mechanism comprises a reversible electric motor, a shaft driven by the motor, a driven member drivably connected to the shaft, first and second stop members in spaced-apart relation on the driven member, a lever arm having a pivot point and means remote from the pivot point pivotally connecting the lever arm and the window. The lever arm extends between the first and second stop members and is adapted to be engaged by one of the stop members when the window is being opened and by the other when the window is being closed. The mechanism is arranged so that there is lost motion between the shaft and the lever arm and the motor operates initially under a low load when the window is intended to be opened and closed.

---

The present invention relates to mechanisms for opening and closing windows, utilizing electric motors.

After an electric motor is energized, there is gradual build-up of the torque output of the motor to its maximum over a certain period of time which will vary from motor to motor. This characteristic presents a distinct disadvantage when an electric motor is used to operate a window opening and closing mechanism. Thus, as soon as it is energized, the motor may have to act on the full load of the window and the opening and closing mechanism, and it may not have sufficient initial torque to drive the load. In this event, the motor may stall. Thus it may be necessary to employ a larger motor having a larger starting torque than would be required to open or close the window after opening or closing movement has begun.

The present invention provides an opening and closing mechanism utilizing an electric motor in which the aforementioned disadvantage of electric motors is overcome. In the mechanism, according to the present invention, the motor operates initially under a low load, so that it may attain at least the torque necessary to open or close the window prior to encountering the full load of the window and the operating mechanism.

The motor-driven opening and closing mechanism of the present invention comprises a reversible electric motor, a shaft driven by the motor, a driven member drivably connected to the shaft, first and second stop members in spaced-apart relation on the driven member, a lever arm having a pivot point and means remote from the pivot point pivotally connecting the lever arm and the window. The lever arm extends between the first and second stop members and is adapted to be engaged by one of the stop members when the window is being opened and by the other of the stop members when the window is being closed. The driven member is movable between a first position in which the window is closed and a second position in which the window is fully open. In the first position, the first stop member is spaced apart from the lever arm and is movable into engagement with the lever arm when the motor is operated in a direction to open the window, whereby there is lost motion between the shaft and the lever arm and the motor operates initially under low load until the first stop member engages the lever arm. In the second position, the second stop member is spaced apart from the lever arm and is movable into engagement with the lever arm when the motor is operated in a direction to close the window, whereby there is lost motion between the shaft and the lever arm and the motor operates initially under low load until the second stop member engages the lever arm.

The invention is illustrated by the accompanying drawings, in which:

FIGURE 1 is a perspective view showing a window, its frame and one embodiment of the invention;

FIGURE 2 is a plan view of the opening and closing mechanism of FIGURE 1 with the window in the closed position;

FIGURE 3 is a sectional view taken along line III—III of FIGURE 2;

FIGURE 4 is a plan view of the opening and closing mechanism of FIGURE 2 with the window being opened;

FIGURE 5 is a sectional view taken along line V—V of FIGURE 4;

Figure 6:
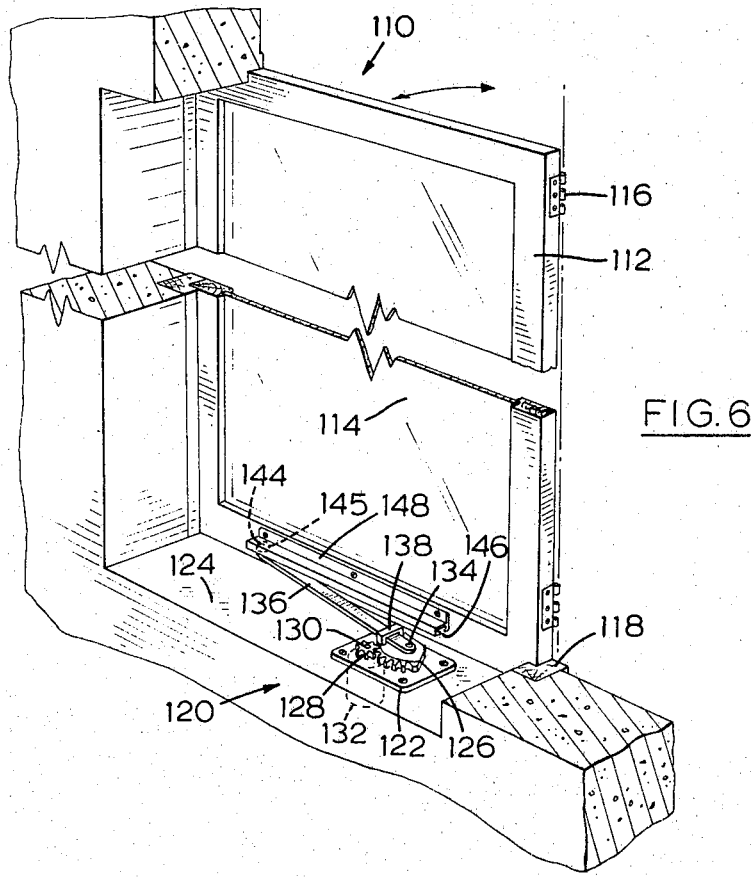
FIGURE 6 is a perspective view of a window, its frame and an alternative embodiment of the invention.

In the drawings, referring first to the embodiment of FIGURES 1 to 5, a window 10 consists of a sash 12 supporting a pane 14. The window is hinged to the window frame 18 by hinges 16 located at the top of the sash 12, whereby the window may be opened and closed.

An opening and closing mechanism generally indicated at 20 comprises a supporting plate 22 secured to the window sill 24. On the supporting plate 22 are pivotally mounted two quadrant-shaped, intermeshing gears 26, 28. Gear 28 also intermeshes with gear wheel 30 mounted on the shaft 32 of a reversible electric motor 34. The gears 26, 28 therefore constitute the driven members of the mechanism. The drive for the gears 26, 28 could be provided by means other than the intermeshing gear wheel 30. For example, one of the gears 26, 28 could be mounted on the output shaft of a gear reduction unit driven by the motor and be driven in that manner.

The motor 34 or combined motor-gear reduction unit is mounted below the supporting plate, and the shaft 32 projects upwardly through the plate 22. The motor 34 is energized from a source of electrical energy through a reversing switch, for example.

Pivot pins 36 and 38 are provided to pivotally mount the gears 26, 28 respectively on the supporting plate 22. Pivot pins 36 and 38 also serve as pivots for gears 26, 28 respectively.

Each of the gears 26, 28 is provided with an integral generally U-shaped wall 44, 46 upstanding from the top face of the gear. The opposite diverging arms 43 and 45 of the wall 44 constitute first and second stop members. Similarly, the opposite diverging arms 47 and 49 of the wall 46 constitute first and second stop members. The levers arms 40, 42 extend between these first and second stop members. The generally U-shaped, integral, upstanding wall comprising the first and second stop members could be replaced by other means constituting the stop members. Thus, a pair of spaced-apart upstanding posts on each gear, located one on each side of the appropriate lever arm would suffice.

Cranked lever arm 40 is pivotally connected to an arm 48 by a pivot pin 50. In the area of the pivot pin 50 the ends of the arms 40 and 48 are bent upwardly, as seen in FIGURE 1. In addition, the pivotal connection between the arms 40 and 48 is quite loose. Arm 48 is pivotally connected to one end of an elongated bracket 52 by a pivot pin 54, the bracket being fixedly mounted to the sash 12 of the window 10.

Similarly, cranked arm 42 is pivotally connected to an arm 56 by a pivot pin 58. The ends of the arms 42 and 56 are bent upwardly in the area of the pivot pin 58, in similar manner to the ends of arms 40 and 48. In common with the pivotal connection between arms 40 and 48, the pivotal connection between the arms 42 and 56 is quite loose. Arm 56 is pivotally connected to the other end of bracket 52 by a pivot pin 60.

The lever arms 40 and 42 are therefore pivotally connected to the window by means of arms 48, 56, bracket 52 and pivot pins 50, 54, 58 and 60. The means that pivotally connect the lever arms 40 and 42 to the window thus are located adjacent the ends of the lever arms remote from their pivotal connection to the driven members. Such a construction could be varied to place the means pivotally connecting the lever arm to the window at any point along the lever arm, provided that it is remote from the pivot connecting the lever arm to the driven member.

The operation of the embodiment of the invention illustrated in FIGURES 1 to 5 will now be described. The mechanism 20 assumes the position illustrated in FIGURES 1 to 3 when the window is closed. In this position, as clearly shown in FIGURE 3, the arms 43 and 47 constituting first stop members are spaced apart from the lever arms 40 and 42 respectively. The arrangement constitutes a first position for the driven gears.

When the electric motor 34 is turned on, gear wheel 30 rotates in a clockwise direction driving gears 28 and 26. The load placed on the motor by the gears during this phase of the operation is low, and the torque output of the motor is able to build up during this low load phase.

As the gear wheels 26 and 28 rotate on pivot pins 36 and 38 respectively, first stop members 43 and 47 approach lever arms 40 and 42 and eventually engage the lever arms. FIGURE 5 shows the first stop member 47 engaging lever arm 42. Upon engagement of the stop members and the lever arms, the motor is subjected to the much higher load of the whole mechanism and the window, and the torque output, achieved by reason of the lost motion between the shaft 32 and the lever arms 40 and 42 during the rotation of the gears 26 and 28 prior to engagement between the first stop members and the lever arms, is at least sufficient to continue rotation of the gear 30 and thereby the gears 26 and 28, after engagement of the first stop members with the lever arms As the gears 26 and 28 continue to rotate about pivot pins 36 and 38, engagement of the first stop members 43 and 47 with lever arms 40 and 42 respectively causes the lever arms 40 and 42 to rotate about the pivot pins 36 and 38 respectively, thereby moving pivot pins 50 and 58 towards each other and opening the window. The operation is continued until the window is as far open as desired.

As the window is opened, the height of the bracket 52 is raised relative to the plane of the sill 24, thereby tending to strain the mechanism This strain is compensated by the upwardly bent ends of the arms 40, 42, 48 and 56 and the looseness of pivot pins 50 and 58 described above.

When the window is in its open position, the arms 45 and 49, constituting second stop members, are spaced apart from the lever arms 40 and 42 respectively, as can be seen from FIGURE 5. This arrangement constitutes a second position for the driven gears When it is desired to close the window, the electric motor 34 is operated to run in the opposite direction from that when the window is being opened, and upon actuating the motor 34, gear wheel 30 rotates in an anti-clockwise direction, thereby driving gears 28 and 26. As in the case where the window is being opened, the load placed on the motor by the gears during this phase of the operation is low. This low load allows the torque output of the motor to build up.

As the gear wheels 26 and 28 rotate on pivot pins 36 and 38 respectively, second stop members 45 and 49 approach and eventually engage the lever arms. The relative position of the lever arm 42 and the first and second stop members 47 and 49 following such engagement is shown in FIGURE 3. Upon such engagement, the motor is subjected to the much higher load of the whole mechanism and window. The torque output of the motor, achieved by reason of the lost motion between the shaft 32 and the lever arms 40 and 42 during the rotation of the gear wheels 26 and 28 prior to engagement between the second stop members and the lever arms, is at least sufficient to continue rotation of the gear wheel 30 and, thereby, the gears 26 and 28 after engagement of the second stop members with the lever arms.

As gears 26 and 28 continue to rotate about pivots 36 and 38, engagement of the second stop members 45 and 49 with the lever arms 40 and 42 respectively causes the lever arms to rotate about pivot pins 36 and 38 respectively, in a direction opposite to their direction of rotation when the window is being opened, thereby moving the pivot pins 50 and 58 away from each other. The window is thereby closed. The operation is continued until the window is fully closed, or until any desired positioned between the fully open and fully closed position is attained The window may be locked closed in any convenient manner either manually or automatically.

A possible modification to this embodiment of the invention would be to remove the gear 26 and the associated pivot, lever arm, arm and pivots, relying on a single lever arm. However, it is preferred to employ two lever arms in the embodiment illustrated, or binding might result.

Figure 7:
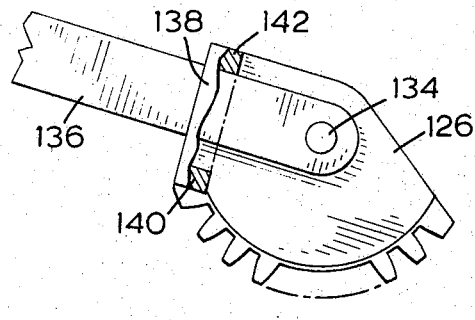
FIGURE 7 is a plan view, partly in section, of a detail of the mechanism shown in FIGURE 6.

The embodiment of FIGURES 6 and 7 includes a window 110 having a sash 112 supporting a pane 114. The window is hinged to the window frame 118 by hinges 116 located at one side of the sash 112, whereby the window may be opened and closed.

An opening and closing mechanism generally indicated at 120 comprises a supporting plate 122 secured to the window sill 124. On the supporting plate 122 is pivotally mounted a gear member 126. Gear member 126 intermeshes with a gear wheel 128 mounted on the shaft 130 of a reversible electric motor 132. Gear member 126 therefore constitutes a driven member. The drive for the gear member 126 could be provided by means other than the intermeshing gear wheel 128. For example, the gear member could be mounted directly on the output shaft of a motor-gear reduction unit and be driven in that manner. In this latter arrangement, gear teeth on the driven member are obviously not necessary.

The motor 132 is mounted below the supporting plate 122, and the shaft 130 projects upwardly through the plate 122. The motor 132 is energized by suitable means, not shown. A pivot pin 134 is provided to pivotally mount the gear member 126 on the supporting plate 122. Pivot pin 134 also serves as a pivot pin for a lever arm 136. Lever arm 136 is shown pivotally connected to the pivot pin 134 adjacent one of its ends. This connection could equally well be at any point intermediate the ends of lever arm 136.

Gear member 126 is formed with an integral bridge 138 which bridges the lever arm 136. The uprights 140 and 142 of the bridge constitute first and second stop members respectively between which lever arm 136 extends.

Other constructions are obviously possible to provide the first and second stop members.

A wheel 144 is rotatably mounted on an axle 145 fixed to lever arm 136. The wheel 144 is located slidably in a channel 146 of a bracket 148. The bracket 148 is fixedly attached to the sash 112. Lever arm 136 is therefore pivotally connected to the window by means of wheel 144, axle 145 and bracket 148.

The operation of the embodiment of FIGURES 6 and 7 will now be described. The mechanism 120 assumes the position shown in FIGURES 6 and 7 when the window is closed. In this position, upright 140 constituting the first stop member is spaced apart from the lever arm 136. This position constitutes a first position for the driven gear 126 and the arrangement is more clearly illustrated in FIGURE 7. Such an arrangement constitutes a first position for the driven gear member.

When the electric motor 132 is turned on, gear wheel 128 rotates in a clockwise direction driving gear member 126. The load placed on the motor by the gears during this phase of the operation is low and the torque output of the motor is able to build up during this low load phase.

As the gear member 126 rotates on pivot 134, the first stop member 140 approaches and eventually engages the lever arm 136. Upon engagement of the first stop member 140 and the lever arm 136, the motor is subjected to the much higher load of the whole mechanism and the window. The torque output of the motor, achieved by reason of the lost motion between the shaft 130 and the lever arm 136, during the rotation of the gear member 126 prior to engagement between the first stop member 140 and the lever arm 136, is at least sufficient to continue rotation of the gear wheel 128 and, thereby, gear member 126 after engagement of the first stop member and the lever arm.

As the gear member 126 continues to rotate about pivot 134, engagement of the first stop member 140 and the lever arm 136 causes pressure to be exerted on the wheel 144 thereby opening the window. As the window opens, the wheel 144 slides in the channel 146. The operation is continued until the desired degree of opening of the window is achieved.

When the window is open, the upright 142, constituting the second stop member is spaced apart from the lever arm 136. This arrangement constitutes a second position for the driven gear member 126.

When it is desired to close the window, the motor 132 is switched on and is operated in the reverse direction from when the window is being opened. Gear wheel 128 rotates in an anti-clockwise direction driving gear member 126. As when the window is being opened, the load placed on the motor by the gears during this phase of the closing operation is low. The low load allows the build-up of motor torque output.

As the gear member 126 rotates about pivot 134, the second stop member 142 approaches and eventually engages the lever arm 136. Upon engagement of the second stop member 142 and the lever arm 136, the motor is subjected to the much higher load of the whole mechanism and the window. At this point the torque output of the motor, achieved by reason of the lost motion between the shaft 130 and the lever arm 136 during the rotation of the gear member 126 prior to engagement between the second stop member 142 and the lever arm 136, is at least sufficient to continue rotation of the gear wheel 128 and, thereby, gear member 126 after engagement of the second stop member and the lever arm.

As the gear member 126 continues to rotate about pivot 134, engagement between the second stop member 142 and the lever arm 136 causes pressure to be exerted on the wheel 144, thereby closing the window. As the window closes, wheel 144 slides in the channel 146.

The window may be locked in its closed position by any convenient manual or automatic means.

Modifications are possible within the scope of the present invention.

What I claim is:

1. A motor-driven mechanism for opening and closing a window comprising: a reversible electric motor; a shaft driven by said motor; a driven member drivably connected to said shaft; first and second stop members in spaced-apart relation on said driven member; a lever arm having a pivot point; and means remote from said pivot point connecting said lever arm and said window; said lever arm extending between said first and second stop members; said lever arm being adapted to be engaged by one of said stop members when said window is being opened and to be engaged by the other of said stop members when said window is being closed; said driven member being movable between a first position in which said window is closed and a second position in which said window is fully open; in said first position said first stop member being spaced apart from said lever arm and movable into engagement with said lever arm when said motor is operated in a direction to open said window, whereby there is lost motion between said shaft and said lever arm and said motor operates initially under low load until said first stop member engages said lever arm; in said second position said second stop member being spaced apart from said lever arm and movable into engagement with said lever arm when said motor is operated in a direction to close said window, whereby there is lost motion between said shaft and said lever arm and said motor operates initially under low load until said second stop member engages said lever arm.

2. The mechanism of claim 1 wherein said driven member has an at least partially circular periphery, said periphery being provided with a plurality of gear teeth, and including a gear wheel mounted on said shaft and adapted to drive said driven member via said gear teeth, whereby said driven member is drivably connected to said shaft.

3. The mechanism of claim 1 wherein said pivot point is located adjacent one end of said lever arm and said means remote from said pivot point is located adjacent the other end of said lever arm.

4. The mechanism of claim 1 wherein said means remote from said pivot point comprises anchoring means located on said window and an arm pivotally attached adjacent one end to said anchoring means, the other end of said arm being pivotally connected to said lever arm.

5. The mechanism of claim 1 whereas said means remote from said pivot point comprises an elongated member secured to said window and a slidable bearing member adapted to slide on said elongated member, said bearing member being mounted on said lever arm.

6. The mechanism of claim 2 wherein said first and second stop members comprise the uprights of a bridge mounted on said driven member over said lever arm.

7. The mechanism of claim 1 wherein said pivot point is a pivot pin, both said driven member and said lever arm being pivotally mounted on said pivot pin.

8. A motor-driven mechanism for opening and closing a window comprising a reversible electric motor; a shaft driven by said motor; a gear wheel mounted on said shaft; first and second driven members; first and second stop members located in spaced-apart relation on each of said driven members; a first lever arm having a first pivot point; a second lever arm having a second pivot point; first means remote from said first pivot point connecting said first lever arm and said window; and second means remote from said second pivot point connecting said second lever arm and said window; each of said first and second driven members having an at least partially circular periphery provided with a plurality of gear teeth; said gear teeth on said first driven member intermeshing with said teeth on said second driven member; said gear wheel mounted on said shaft being adapted to drive one of said driven members via its said gear teeth, whereby said driven members are drivably connected to said shaft; said first lever arm extending between said first and second stop members on said first driven member; said second lever arm extending between said first and second stop members on said second driven member; said first lever arm being adapted to be engaged by one of said stop members on said first driven member while said second lever arm is adapted to be engaged simultaneously by one of said stop members on said second driven member when said window is being opened, said first lever arm being adapted to be engaged by the other of said stop members on said first driven member while said second lever arm is adapted to be engaged simultaneously by the other of said stop members on said second driven member, when said window is being closed; each of said driven members being movable between a first position in which said window is closed and a second position in which said window is fully open; in said first position of said first and second driven members, said first stop member on said first driven member being spaced apart from said first lever arm and being movable into engagement with said first lever arm, and said first stop member on said second driven member being spaced apart from said second lever arm and being movable into engagement with said second lever arm simultaneous with movement of said first stop member on said first driven member into engagement with said first lever arm when said motor is operated in a direction to open said window, whereby there is lost motion between said shaft and said first and second lever arms and said motor operates initially under low load until said first stop member on said first driven member engages said first lever arm and until said first stop member on said second driven member simultaneously engages said second lever arm; in said second position of said first and second driven members, said second stop member on said first driven member being spaced apart from said first lever arm and being movable into engagement with said first lever arm, and said second stop member on said second driven member being spaced apart from said second lever arm and being movable into engagement with said second lever arm, simultaneous with movement of said second stop member on said first driven member into engagement with said first lever arm, when said motor is operated in a direction to close said window, whereby there is lost motion between said shaft and said first and second lever arms and said motor operates initially under low load until said second stop member on said first driven member engages said first lever arm and until said second stop member on said second driven member simultaneously engages said second lever arm.

9. The mechanism of claim 8 including a first upstanding wall on said first driven member and a second upstanding wall on said second driven member; said first and second walls being of substantially identical U-shape, having a pair of side arms integral with a curved portion, said side arms diverging from each other in a direction away from said curved portion; said curved portion of said first wall being adjacent said first pivot point and said side arms of said first wall extending in the same general direction as said first lever arm, said arms of said first wall comprising said first and second stop members of said first driven member; said curved portion of said second wall being adjacent said second pivot point and said side arms of said second wall extending in the same general direction as said second lever arm, said arms of said second wall comprising said first and second stop members of said second driven member.

10. The mechanism of claim 9 wherein said window is hinged along the top edge thereof and wherein said first means remote from said first pivot point includes a first arm pivotally connected adjacent one end to said first lever arm and pivotally connected adjacent the other end to one end of an elongated bracket member secured to said window adjacent the bottom edge thereof, and said second means remote from said second pivot point includes a second arm pivotally connected adjacent one end to said second lever arm and pivotally connected adjacent the other end to the other end of said elongated bracket member.

11. The mechanism of claim 7 wherein said first pivot point is a first pivot pin, both said first driven member and said first lever arm being pivotally mounted on said first pivot pin, and said second pivot point is a second pivot pin, both said second driven member and said second lever arm being pivotally mounted on said second pivot pin.

References Cited

UNITED STATES PATENTS

| 2,767,979 | 10/1956 | Hummert | 49—324 |
| 3,273,410 | 9/1966 | Pickles | 74—89.18 |
| 3,438,151 | 4/1969 | Evers et al. | 49—324 X |

J. KARL BELL, Primary Examiner

U.S. Cl. X.R.

49—341; 74—18, 89, 89.14